United States Patent [19]
Harvey

[11] 3,800,486
[45] Apr. 2, 1974

[54] PIPE SPACER

[75] Inventor: Richard Harvey, Omaha, Nebr.

[73] Assignee: William H. Harvey Company, Omaha, Nebr.

[22] Filed: July 24, 1972

[21] Appl. No.: 274,309

Related U.S. Application Data

[63] Continuation-in-part of Ser. No. 70,179, Sept. 8, 1970, abandoned.

[52] U.S. Cl........ 52/98, 52/220, 52/577, 138/96 R, 220/3.4, 220/27, 249/61, 285/4, 285/56
[51] Int. Cl............................................. E04b 1/00
[58] Field of Search......... 52/577, 220, 99, 127, 98; 249/177, 183, 175, 61, 97; 285/56, 58, 3, 4, 57, 59, 60; 4/68; 138/96 R, 89, 103, 109, 114, DIG. 9; 220/3.4, 24 R, 27

[56] References Cited
UNITED STATES PATENTS

| | | | |
|---|---|---|---|
| 3,048,911 | 8/1962 | Almon | 16/2 |
| 3,606,074 | 9/1971 | Hayes | 220/42 |
| 2,747,493 | 5/1956 | Noll | 172/604 |
| 3,032,939 | 5/1962 | Andersen | 51/263 |

Primary Examiner—Henry C. Sutherland
Assistant Examiner—Mark H. Wolk
Attorney, Agent, or Firm—Bosworth, Sessions & McCoy

[57] ABSTRACT

A spacer or emplacement former is provided to fit about a soil pipe or the like that is to be substantially embedded in or surrounded by a construction material such as concrete. The spacer reserves an annular space in the construction material immediately surrounding the pipe for the emplacement of subsequent connection or emplacement of other plumbing fixtures.

The present spacer comprises a generally cup-shaped member, adapted to receive a pipe or the like telescopically, having an open end, and also having a closed but removable end. The spacer is aligned with pipes of various diameters by aligning means adjacent its closed end adapted to align the spacer with pipes of various diameters, and by means of a series of fingers that extend radially inwardly of the spacer adjacent its open end. The fingers are formed of friable material of substantial cross section and are adapted to break off at essentially any suitable radial distance within the lengths of the fingers in order to provide aligning surfaces on the ends of the fingers to accommodate inwardly of the fingers and closely fit, pipes of varying diameters to aid in aligning the spacer with such pipes. Preferably, the fingers are formed of friable foamed plastic material.

14 Claims, 6 Drawing Figures

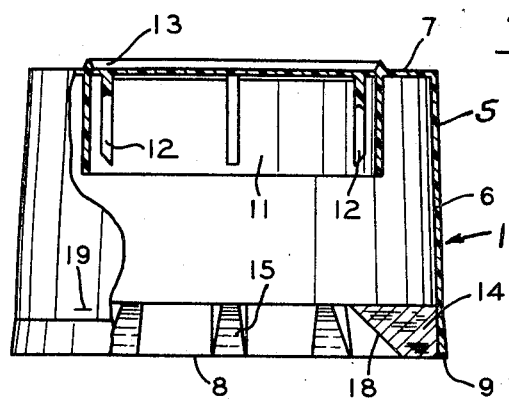
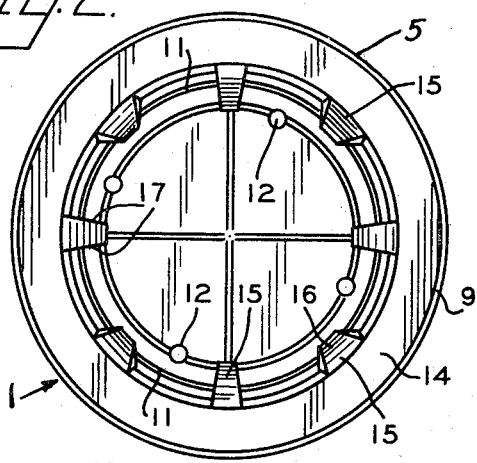
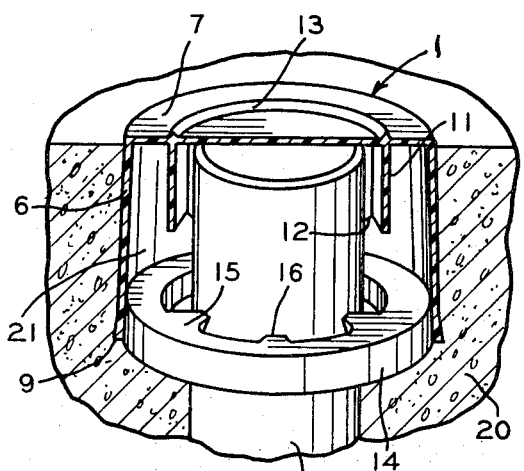
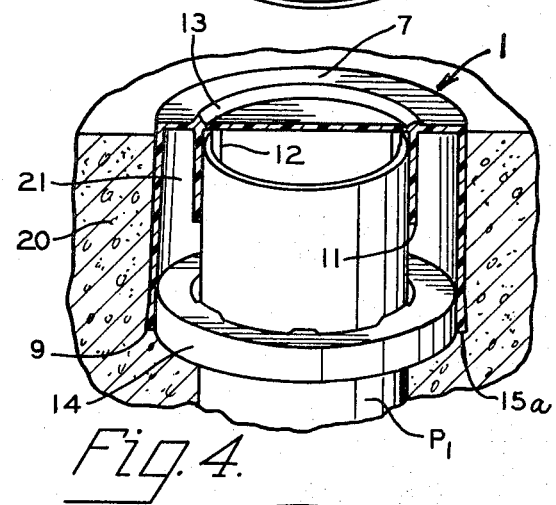
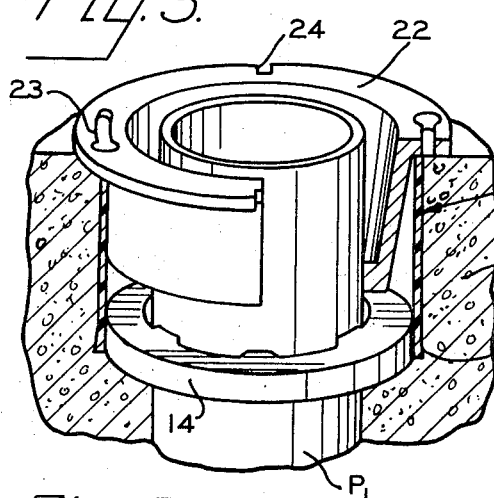
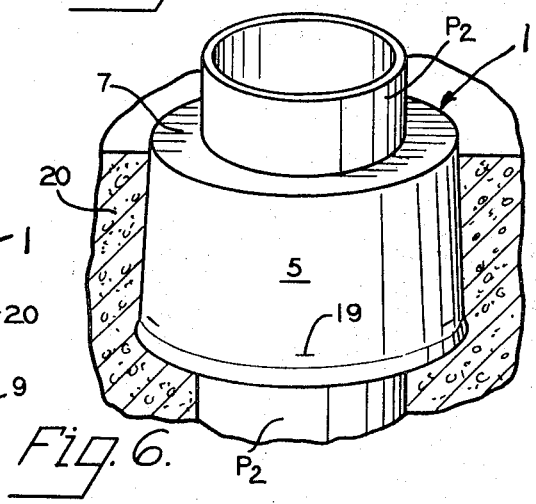

PIPE SPACER

CROSS REFERENCE TO RELATED APPLICATION

This application is a continuation-in-part of applicant's U.S. Pat. application Ser. No. 70,179, now abandoned, filed Sept. 8, 1970.

BACKGROUND OF THE INVENTION

The present invention relates to a spacer or emplacement former for covering an open end of a pipe or the like, and more particularly, for temporarily closing the ends of soil pipes of different diameters while reserving and protecting an open generally annular zone surrounding the pipe when construction material, such as concrete, is formed about the pipe to form a floor.

For convenience of disclosure, the present spacer is described for use in surrounding and temporarily capping a vertically disposed soil pipe for a floor mounted water closet. However, it is understood that the spacer can be used with other types of pipes and in other annular dispositions, such as with pipes extending horizontally in a wall.

In constructing a floor for a lavatory and the like on which a water closet is mounted, a soil pipe for the water closet is placed so as to extend vertically, and the floor is subsequently built or laid around it. Often, the floor is made of material that is poured to form a floor and that hardens, such as concrete or other castable and hardenable material. Later the pipe is connected to a water closet or to other pipes as may be desired. To accomplish this a fitting such as a flange or coupling, must be attached to the end of the soil pipe. This necessitates an open annular zone or recess immediately surrounding the pipe at and below the floor level. In the past, it has usually been necessary to cut away part of the cast floor around the pipe. Where the floor comprises concrete or other hardened poured material, it is necessary to chip and chisel away enough of such material to provide the space required. The chipping away of the floor is arduous and time-consuming and materially adds to the labor cost of the construction.

SUMMARY OF THE INVENTION

The present spacer is designed to fit around the exposed end of a pipe having a diameter falling within a wide range of sizes, to reserve an annular recess when a wall or floor of concrete or other material is poured or otherwise formed about the pipe end. The reserved recess allows subsequent installation of other equipment such as a flange or coupling without laboriously chipping away portions of the floor material.

In a preferred form, the spacer of the invention comprises a cup-shaped, cylindrical plastic cap member having one end closed and the other end opened. The closed end prevents entry into the pipe of foreign, extraneous, matter but can be cut or broken away when desired to reach the pipe end as for connection to other parts. The cup-shaped member adjacent its closed end has aligning means to align it with the pipe; the aligning means preferably can align the cup-shaped member adjacent its closed end with pipes of various diameters. A plurality of fingers preferably equally angularly spaced around the interior of the spacer, extend radially inwardly of the cup-shaped member adjacent its open end. The fingers are of substantial cross sections and formed of friable material adapted to break at sections longitudinally of the fingers at any location over a substantial length of the fingers to produce shorter fingers having on the broken ends of the remaining portions of the fingers aligning surfaces that can extend generally axially of and in close proximity to the outside surface of a pipe having any one of a plurality of diameters. In a preferred embodiment, alternate fingers are of two lengths, the longer fingers being adapted substantially to clear but contact a widely used pipe of smaller diameter, and the shorter fingers being adapted substantially to clear but contact a widely used pipe of larger diameter. The longer fingers are usually the only ones that need be broken.

The cup-shaped member of the spacer preferably is formed of hardened synthetic resin or plastic, and preferably the radial fingers are formed of friable, plastic material such as foamed plastic material. This combination renders the spacer light in weight although substantially rigid, relatively inexpensive to produce, and easy to install.

BRIEF DESCRIPTION OF THE DRAWINGS

In the accompanying drawings:

FIG. 1 is a side elevational view, partly in diametrical section, of a spacer of the present invention, when not used;

FIG. 2 is a bottom plan view of FIG. 1;

FIG. 3 is a perspective view, in diametrical section of the spacer of FIGS. 1 and 2 installed about an end pipe in a concrete floor;

FIG. 4 is a perspective view, in a diametrical section, of the spacer of FIGS. 1 and 2 installed in a concrete floor about the end of a pipe of larger diameter than that of FIG. 3;

FIG. 5 is a perspective view, partly in section, of the embodiment of FIG. 4 in which a flange ring is mounted about the pipe through a cut-away, previously closed end, of the spacer; and FIG. 6 is a perspective view, partly in section, of a modified installation in which only part of the closed end of the spacer is cut away, and the pipe extends above the floor level for another type of use or connection.

DESCRIPTION OF THE PREFERRED EMBODIMENTS

Referring to the drawings, the spacer embodiment 1 illustrated includes a cup-shaped member 5, having a generally cylindrical sidewall portion 6 having a closed end 7 and an open end 8. The portion 6 preferably has a slight outward flare in the direction of the open end 8, and a terminal rim 9 at its open end preferably of a somewhat greater flare to provide greater thickness for strength.

The closed end 7 carries, inside of member 5, pipe-aligning means of which two forms, 11 and 12, are shown; they can be used singly or in combination. One form is annular flange 11 extending generally axially inwardly of member 5 from its closed end; flange 11 is also preferably coaxially aligned with an external circular ridge 13 extending outwardly from the closed end 7 as shown in FIGS. 1 and 3 and preferably sized to fit closely outside of a widely used pipe of larger diameter, such as a 4 inch outside diameter pipe. The other aligning means shown is a series of pin members 12 equiangularly and equidistantly spaced radially inwardly of the flange 11, and extending axially of the spacer from its closed end 7; they are radially spaced preferably to fit closely outside of a widely used pipe of smaller diameter, such as a 3 inch outside diameter pipe. Their free ends are preferably tapered inwardly as shown in FIG. 1 to guide a pipe radially outside of the pins. If desired, the positions of the flange 11 and pin members 12 could be reversed, and the flange could be spaced radially inside the pin members 12. Alternatively, two flanges like flange 11 or two sets of pin members like members 12 could be used in place of one flange and one set of pin members.

The member 5, including portions 6, 7, 9, 11, 12 and 13, is preferably molded in one piece from any of a number of known synthetic resin materials, such as polyacrylic acid, polyacrylic esters, polymethacrylic acid, polymethacrylic esters, polyvinyl acetate, polyvinyl butyral, polyvinyl alcohol, polyvinyl chloride, polyvinylidene chloride, cellulose acetate, polyethylene, polypropylene, polystyrene, nylon, as well as still other materials.

The tapered configurations of portions 6 and 9 as well as flange 11 and pins 19 aid in molding; and the tapered configurations of portion 6 and rim 9 also prevent the body from being pulled out of the cast floor in use.

The illustrated spacer also has adjacent the open end of member 5 pipe-aligning means in the form of a ring 14 having radially inwardly extending fingers 15, 16. The structure formed of ring 14 and fingers 15, 16 preferably is a one piece member separately formed from cup-shaped member 5. Fingers 15 and 16 alternate, and fingers 15 are longer than fingers 16. Fingers 15 are preferably long enough substantially to clear and contact a widely used pipe of a smaller diameter, such as the 3 inch outside diameter pipe mentioned above; fingers 16 are only long enough substantially to clear and contact the outside of a widely used pipe of a larger diameter, such as the 4 inch outside diameter pipe mentioned above. The fingers may be of any convenient shape, of substantial cross section inwardly of their ends; the fingers preferably are tapered from their free ends toward their ends supported from ring 14. In the illustrated embodiment, the sides 17 of the fingers are tapered to increase the width of the fingers from their free ends toward their supported ends, while the transverse bottom surfaces 18 are tapered to increase the depth of the fingers from their free to their supported ends. The last-mentioned taper aids in centering a pipe with respect to the generally cylindrical sidewalls 6 as the spacer is telescopically placed over the pipe. Staples 19 firmly fix the ring 14 inside the cup-shaped member 5 adjacent its open end.

The frangible fingers 15 and 16, and if desired ring 14, may be formed of any suitable solid friable material that has sufficient strength to withstand handling until broken by manually applied force, at any location over a substantial length of the fingers. Preferably the fingers and ring are cast or molded in one piece of friable foamed or cellular plastic material such as foamed polystyrene, polyurethanes, polyethylene, polyesters, and the like, although cork-like material such as cork or other suitable friable material may be used. The foamed or cellular structure has little or no water absorption when the cells are closed as is preferable, and the foamed or cellular characteristic contributes to the light weight of the spacer while rendering the frangible fingers 15 and 16 susceptible to easy fracture at any location desired along the fingers.

In use, the spacer is telescopically installed about the open end of a pipe. As the open end 8 of the cup-shaped member 5 passes the upper open end of the pipe, the ends of fingers 15 and 16 of ring 14 may, if necessitated by the side of the pipe, break away to an extent determined by the outside diameter of the pipe, each finger being broken only to the extent needed to pass the pipe because of the friable nature of the material of which the fingers are formed. The remaining stub portions of the fingers (or of any unfractured fingers of those too short to be broken) can contact the pipe and thereby center the spacer 1 with respect to the pipe. In this manner, the bottom open end 8 of the spacer is also automatically aligned about the pipe, and the spacer is self-adapting to pipes of widely different diameters. Larger pipes break off greater portions of the radially inwardly directed fingers than smaller pipes.

At the closed end 7 of the spacer, the flange 11 or pin members 12 center the spacer and the upper end of the pipe relative to each other. The diameter of the pipe determines whether the flange 11 and pin members 12 are used separately, or in cooperation with each other in aligning the spacer and pipe. In the illustrated embodiment of the spacer, for example, the pin members 12 fit inside a pipe of outside diameter of 4 inches and outside of a pipe of a diameter of 3 inches. When the pin members 12 are on the inside of a pipe, the flange 11 is preferably located so that it is in close proximity to the outside of a pipe of usual thickness, to aid in alignment. If desired, the described parts can be dimensioned so that the flange 11 may fit on the inside of pipes of relatively large diameters.

FIGS. 3 and 4 illustrate the relative positions of identical spacers embodying the invention and two different pipes, after the spacers have been placed around their open ends as just described. In FIG. 3, the end of a pipe P of relatively small, such as 3 inch, outside diameter contacts the tips of longer fingers 15, which may be unbroken, and widely clears fingers 16; and also is located inside of pin members 12 and in contact with closed end 7. In FIG. 4, pipe $P_1$ of a larger diameter than pipe P, such as 4 inch outside diameter, has broken away necessary radial lengths of longer fingers 15 and contacts the broken ends of fingers 15 and the tips of shorter fingers 16, which may be unbroken. Also because of its greater diameter, pipe $P_1$ fits outside of pin members 12 but between those members and in contact with the flange 11. Both the pin members 12 and flange 11 are so located relative to the outside surface of the pipe they contact that, in conjunction with their flexibility, they firmly grasp or lock onto the pipe and hence prevent tipping or floating of the spacer about, or accidental dislodgment of the spacer from, the end of a pipe.

The floor is next laid as by pouring concrete, leveling it to a desired height, and allowing it to harden to form a cast concrete floor 20. The spacer 1 reserves an annular zone 21 about each of the pipes P and $P_1$.

The closed end 7 of the cup-shaped spacer is next removed, preferably completely, as by cutting away as by a sharp edged tool or even by breaking it away. Thereafter, a flange, coupling, or any other desired fitting may be installed on the pipe end in the reserved end.

In the embodiment of FIG. 5, the entire closed end has been cut away and a standard end flange 22 has been conventionally installed on pipe P₁. The flange 22 has bayonet slots 23 and notches 24 to permit conventional connections to other known fittings or fixtures, not shown.

In some instances, a pipe extends above the finished grade of a gloor. Also, it is not necessary always to cut away the entire closed end 7. FIG. 6 illustrates these modifications. In this case, only the central portion of the end 7 is removed. The raised ridge 13 in this instance serves as a guide for the cutting tool. The spacer, now open at both ends, is slipped about a pipe P₂ and moved to the proposed floor level. Thereafter, when the concrete floor 20 is laid as shown in FIG. 6, the spacer 1 protects and reserves a zone about pipe P₂, as previously described, for any subsequent work to be done on the pipe at that area.

It is apparent that the spacer may be used with even larger pipe sizes, as with pipes fitting outside of flange 11, particularly when the internal diameter of ring 14 is sized to clear such a pipe; in such case, all fingers 15 and 16 are broken to fit around, and align the spacer with, the pipe.

It is apparent that in the illustrated spacer there are two pipe aligning means, one near the closed end and the other near the open end. Each means is adapted to act to align the spacer with pipes of different sizes. One means, that near the open end in the illustrated embodiment, is adjustable closely to fit the outside of pipes of widely different sizes.

Various other modifications may be made in the illustrated embodiments and the invention may be used for various uses other than those indicated without departing from the spirit of the invention. It is intended that the patent shall cover, by suitable expression in the appended claims, whatever features of patentable novelty reside in the invention.

I claim:

1. A spacer of the character described comprising a generally cup-shaped member having a closed end and an open end adpated to receive the end portion of a pipe or the like; first pipe-aligning means in and supported from said cup-shaped member adjacent its closed end, said first pipe-aligning means including at least two pipe-aligning members radially spaced substantially concentrically of the cup-shaped member selectively to align pipes of a plurality of diameters either between said two pipe-aligning members of said first pipe-aligning means or at a side of a pipe-aligning member of said first pipe-aligning means; and second pipe-aligning means in and supported from said cup-shaped member adjacent its open end, said second pipe-aligning means including fingers comprising friable plastic material adapted to be easily broken off at essentially any longitudinal location thereof over a substantial length of said fingers to accommodate inwardly of the fingers pipes of said plurality of pipe diameters.

2. A spacer of the character described comprising a generally cup-shaped member having a closed end and an open end and adapted to receive the end portion of the pipe or the like; first pipe-aligning means in said cup-shaped member adjacent its closed end, said first pipe-aligning means including at least two axially extending pipe-aligning members radially spaced substantially concentrically of said cup-shaped member selectively to align pipes of a plurality of diameters either between radially spaced pipe-aligning members of said first pipe-aligning means or at a side of a pipe-aligning member of said first pipe-aligning means; and second pipe-aligning means including fingers supporting and extending generally radially inwardly from said cup-shaped member at a location adjacent its open end, said fingers being formed of friable plastic material of substantial cross section that permits said fingers to be easily broken off at essentially any location thereof over a substantial length of said fingers to provide on the broken ends of the remaining portions of said fingers aligning surfaces that extend generally axially of and substantially parallel and in close proximity to the outside surface of a pipe having a diameter corresponding to any of said plurality of pipe diameters to align the open end portion of said spacer with said pipe.

3. The spacer of claim 1 in which one of said two pipe-aligning members of said first pipe-aligning means comprises a generally circular flange extending longitudinally of the cup-shaped member from its closed end and radially spaced from said cup-shaped member.

4. The spacer of claim 2 in which one of said two pipe-aligning members of said first pipe-aligning means comprises a generally circular flange extending longitudinally of the cup-shaped member from its closed end and radially spaced from said cup-shaped member.

5. The spacer of claim 1 in which said two pipe-aligning members of said first pipe-aligning means are supported by said closed end of said cup-shaped member, and in which one of said two pipe-aligning members of said first pipe-aligning means comprises pin members extending axially of the cup-shaped member from its closed end.

6. The spacer of claim 2 in which said two pipe-aligning members of said first pipe-aligning means are supported by said closed end of said cup-shaped member, and in which one of said two pipe-aligning members of said first pipe-aligning means comprises pin members extending axially of the cup-shaped member from its closed end.

7. The spacer of claim 1 in which said two pipe-aligning members of said first pipe-aligning means are supported by said closed end of said cup-shaped member and in which one of said two pipe-aligning members comprises a circular flange and the second of said two members comprises pin members, both said flange and pin members extending axially of said cup-shaped member from its closed end, one of said flange and said pin members being stationed radially inwardly of the other with respect to the cup-shaped member, thereby to receive optionally an end of the pipe or the like either between said flange and pin members or on a side of either of said flange or pin members.

8. The spacer of claim 1 in which a plurality of said fingers extend a greater distance radially inwardly of said cup-shaped member than do a plurality of other fingers disposed between said fingers extending a greater distance.

9. The spacer of claim 2 in which a plurality of said fingers extend a greater distance radially inwardly of said cup-shaped member than do a plurality of other fingers disposed between said fingers extending a greater distance.

10. The spacer of claim 1 in which said fingers extend from a ring member that is attached to the inside of said cup-shaped member.

11. The spacer of claim 1 in which a central portion of said closed end of said cup-shaped member is severable from said cup-shaped member to expose the end of a pipe within said cup-shaped member.

12. The spacer of claim 11 in which said closed end includes means defining a central portion adapted to be severed to expose said pipe.

13. The apparatus of claim 2 in which the plastic of which said fingers are formed is foamed plastic material.

14. The apparatus of claim 1 in which the plastic of which said fingers are formed is foamed plastic material.

* * * * *